US000001187H

United States Statutory Invention Registration [19]

[11] Reg. Number: H1187

George et al.

[43] Published: May 4, 1993

[54] POLYMER BLENDS

[75] Inventors: Eric R. George; William H. Korcz, both of Houston, Tex.

[73] Assignee: Shell Oil Company, Houston, Tex.

[21] Appl. No.: 399,102

[22] Filed: Aug. 28, 1989

[51] Int. Cl.[5] ..... C08G 67/02
[52] U.S. Cl. ..... 525/445; 525/539
[58] Field of Search ..... 525/445, 539; 428/1

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 CQ |
| 4,066,620 | 1/1978 | Kleinschuster et al. | 260/47 C |
| 4,067,852 | 1/1978 | Calundann | 528/190 |
| 4,161,470 | 7/1979 | Calundann | 528/190 |
| 4,184,996 | 1/1980 | Calundann | 260/40 R |
| 4,256,624 | 3/1981 | Calundann | 528/190 |
| 4,355,133 | 10/1982 | East et al. | 524/604 |
| 4,386,174 | 5/1983 | Cogswell et al. | 525/445 |
| 4,798,849 | 1/1989 | Thomas et al. | 521/128 |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,857,605 | 8/1989 | Lutz | 525/445 |
| 4,868,282 | 9/1989 | Van Broekhoven et al. | 528/392 |
| 4,880,903 | 11/1989 | Van Broekhoven et al. | 528/392 |

FOREIGN PATENT DOCUMENTS

| | | |
|---|---|---|
| 121965 | 10/1984 | European Pat. Off. . |
| 181014 | 2/1986 | European Pat. Off. . |
| 213671 | 6/1986 | European Pat. Off. . |
| 257663 | 3/1988 | European Pat. Off. . |
| 1081304 | 1/1967 | United Kingdom . |

OTHER PUBLICATIONS

Dobb et al, Advances in Polymer Sci., 60/61 (1984).
"A New Extrudable Liquid Crystal Polymer with Higher Barrier Properties", Trade Publication, Celanese Corporation.
Apicella et al, Polymer Eng. & Sci., Mid-May, vol. 2, 600-604 (1986).
Blizard et al, ANTEC 1986, pp. 311-315.
Siegmann et al, Polymer, vol. 26, Aug. (Conference Issue) pp. 1325-1330 (1985).

*Primary Examiner*—Robert L. Stoll
*Assistant Examiner*—Joseph D. Anthony
*Attorney, Agent, or Firm*—Denise Y. Wolfs

[57] ABSTRACT

Polymeric blends comprising a major proportion of a linear alternating polymer of carbon monoxide and at least one ethylenically unsaturated hydrocarbon and a minor proportion of a thermotropic liquid crystal polymer exhibit improved mechanical properties of strength and rigidity as well as improved barrier properties.

19 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYMER BLENDS

FIELD OF THE INVENTION

This invention relates to an improved polymer blend comprising predominantly a linear alternating polymer of carbon monoxide and at least one ethylenically unsaturated hydrocarbon. More particularly, the invention relates to blends of the linear alternating polymer with certain other polymeric materials known as liquid crystal polymers.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. G.B. 1,081,304 produced such materials of higher carbon monoxide content in the presence of alkylphosphine complexes of palladium compounds as catalyst. Nozaki extended the process to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent processes for the production of these polymers, now becoming known as polyketones or polyketone polymers, are illustrated by a number of published European Patent Applications including 121,965, 181,014, 213,671 and 257,633. The process typically involves the use of a catalyst composition formed from a compound of a Group VIII metal selected from palladium, cobalt or nickel, the anion of a non-hydrohalogenic acid having a pKa below about 6, preferably below 2, and a bidentate ligand of phosphorus, arsenic or antimony.

The resulting polyketone polymers are relatively high molecular weight crystalline thermoplastics having established utility in the production of shaped articles such as containers for food and drink which are produced by processing the polyketone polymer by known methods. For some particular applications, production of thin wall containers, for example, it has been found to be desirable to have properties which are somewhat different from those of the polyketone polymers. It is on such occasions desirable to retain many of the properties of the polyketone polymer and yet improved other properties. This is often accomplished by the provision of a polymer blend.

The class of liquid crystal polymers is a relatively new type of plastic material which exists at particular temperatures in an intermediate form of state between an isotropic liquid and a solid crystal. An extensive discussion of liquid crystal polymers is provided by Dobb et al, *Advances in Polymer Science*, 60/61 (1984). Such polymers are characterized by a linear, rigid structure which exists in crystalline form in a liquid phase as well as in the solid state. The polymers are further characterized as lyotropic polymers, which require a solvent for formation of a liquid crystalline phase within a defined temperature range, and thermotropic polymers where no solvent is required to maintain a liquid crystal state within the defined temperature range. The rigidity of the polymers is established in one modification by a helix structure maintained by hydrogen bonding or steric hindrance. In an alternate and preferred structure, the polymer consists of a succession of rigid units having connecting bonds that are collinear or at least parallel. The liquid crystals generally have good mechanical properties of strength and stiffness and exhibit low permeability toward gases and liquids. One such class of thermotropic polymers is marketed under the trademark VECTRA® by Hoeschst Celanese and is discussed in a trade publication entitled "A New Extrudable Liquid Crystalline Polymer with Higher Barrier Properties", published by the VECTRA® Business Unit of Celanese Corporation, now Hoechst Celanese.

It is known to modify the properties of thermoplastics through the formation of blends with liquid crystal polymers. Blends of liquid crystal polymer and polystyrene are discussed by Apicella et al., *Polymer Engineering and Sci.*, Mid-May, Vol. 2, pp. 600–604 (1986). Blends of a liquid crystal polymer and polycarbonate are shown by Blizard et al, ANTEC '86, pp. 311–315. Siegmann et al, *Polymer*, Vol. 26, August (Conference Issue), pp. 1325–1330 (1985), discuss blends of a liquid crystal polymer of 6-hydroxy-2-naphthoic acid and p-hydroxybenzoic acid with amorphous polyamides.

It would be of advantage to combine the polyketone polymers and the liquid crystal polymers to obtain blends which exhibit beneficial properties from both blend components.

SUMMARY OF THE INVENTION

The present invention provides blends of linear alternating polymer of carbon monoxide and at least one ethlenically unsaturated hydrocarbon with certain other polymeric material. More particularly, the present invention provides blends of a major porportion of the linear alternating polymer with lesser proportions of thermotropic liquid crystal polymer. The resulting blends exhibit improved mechanical and barrier properties as compared to the unblended polyketone polymer.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the linear alternating polymer have up to 20 carbon atoms inclusive, preferably up to 10 carbon atoms inclusive, and are aliphatic such as ethylene and other $\alpha$-olefins including propylene, 1-butene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illutrative of this latter class of ethylenically unsaturated hydrocarbons are styrene, p-methylstyrene, p-ethylstyrene and m-isopropylstyrene. Preferred polyketone polymers are copolymers of carbon monoxide and ethylene or terpolymers of carbon monoxide, ethylene and a second ethylenically unsaturated hydrocarbon of at least 3 carbon atoms, particularly an $\alpha$-olefin such as propylene.

The structure of the polyketone polymers is that of a linear alternating polymer and the polymer will contain substantially one molecule of carbon monoxide for each molecule of hydrocarbon. When the preferred terpolymers are employed in the blends of the invention there will be within the terpolymer at least two units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain of the preferred polymers is therefore represented by the repeating formula $$\text{+CO+CH}_2\text{—CH}_2\text{)}_x\text{+CO+G)}_y\text{—} \quad \text{(I)}$$

wherein G is the moiety of an ethylenically unsaturated hydrocarbon of at least 3 carbon atoms polymerized through the ethylenic unsaturation thereof. The —CO—$CH_2$—$CH_2$— units and the —CO—G— units are found randomly throughout the polymer chain and the ratio of y:x is no more than about 0.5. In the modification of the blends of the invention wherein copolymer is employed, there will be no second hydrocarbon present and the copolymer is represented by the above formula (I) wherein y is 0. When y is other than 0, i.e., terpolymers are employed as the blend component, preferred ratios of y:x will be from about 0.01 to about 0.1. The end groups or "caps" of the polymer chain will depend upon what materials were present during the production of the polymer and whether and how the polyketone was purified. The precise physical properties of the polymer do not appear to depend to any considerable extent upon the end groups, however, so that the polymers are fairly represented by the formula for the polymeric chain as above represented.

Of particular interest are the polyketones of the above formula (I) of average number molecular weight from about 1000 to about 200,000, particularly those of number average molecular weight of from about 20,000 to about 90,000, as determined by gel permeation chromatography. The properties of such polymers will depend in part on the molecular weight, whether the polymer is a copolymer or a terpolymer and, in the case of terpolymers, the nature of and the proportion of the second hydrocarbon present. Typical melting points of the polyketone polymers are from about 175° C. to about 300° C., more frequently from about 210° C. to about 270° C. The polymers will have a limiting viscosity number (LVN), measured in dl/g employing a standard capillary viscosity measuring device with m-cresol at 60° C., from about 0.5 to about 10, preferably from about 0.8 to about 4.

The method for the production of the polyketone polymers is illustrated by the above published European Patent Applications. In general, the monomers are contacted under polymerization conditions in a reaction diluent in the presence of a catalyst composition formed from a palladium compound, the anion of a nonhydrohalogenic acid having a pKa (measured in water at 18° C.) below 6 and a bidentate ligand of phosphorus. The scope of the polymerization process is extensive but, without wishing to be limited, a preferred palladium compound is a palladium carboxylate, particularly palladium acetate, the preferred anion is the anion of trifluoroacetic acid or p-toluenesulfonic acid, and the preferred bidentate ligand of phosphorus is 1,3-bis(diphenylphosphino)propane or 1,3-bis[di(2-methoxyphenyl)phosphino]propane.

The reaction diluent in which the polymerization si conducted is suitably a lower alkanol such as methanol or ethanol and methanol is preferred. The monomeric reactants, the catalyst composition and the reaction diluent are contacted by conventional methods such as shaking or stirring in a suitable reaction vessel. The polymerization conditions include a reaction temperature of from about 20° C. to about 150° C. with the preferred reaction temperatures being from about 50° C. to about 135° C. Typical reaction pressures are from about 1 atmosphere to about 200 atmospheres, more typically from about 10 atmospheres to about 100 atmospheres. Subsequent to reaction, polymerization is terminated as by cooling the reactor and contents and releasing the pressure. The polyketone polymer is customarily obtained as a product substantially insoluble in the reaction diluent and is recovered by well known procedures such as filtration or decantation. The polyketone polymer product is used in the blends of the invention as recovered or is purified by contact with a solvent or extraction agent selective for catalyst residues.

The minor component of the blends of the invention is a rigid, linear polymer known in the art as a thermotropic liquid crystal. In general, the thermotropic liquid crystal polymers are solvent-free polymers wherein the rigidity of the polymeric chain is maintained by incorporation of aromatic units to provide collinear or parallel bonds between the monomeric units or by incorporation of units which are not aromatic but contain double bonds of a trans-type structure present in carbon-carbon, carbon-nitrogen or carbon-oxygen double bonds. Of these types of rigid structure, those based on the presence of aromatic monomeric moieties are the more common and are preferred. Aromatic monomeric units having a variety of structures are suitable in the thermotropic liquid crystal polymer blend component including monomeric units based on pyridine or benzobisthiazole. The preferred aromatic-based polymers, however, are polyesters which include aromatic units of from 1 to 2 aromatic rings. Typical polyesters are copolymers or are terpolymers and often contain units derived from at least one hydroxyaromatic acid, units derived from aromatic dihydroxy compounds and aromatic dicarboxylic acids, or mixtures of such units. Such polyesters are injection-moldable polymers having a high degree of molecular orientation in the melt form.

Illustrative of aromatic hydroxy compounds employed as monomers in the liquid crystal polymers are compounds of the formula $$R'\text{—O—R—O—}R' \quad \text{(II)}$$

wherein R is a divalent aromatic radical of up to 20 carbon atoms and up to 2 aromatic rings inclusive, which, when two rings are present, are fused or are joined by a direct valence bond, and wherein the connecting valences of R are parallel, that is, are at an angle of 0 degrees or 180 degrees relative to each other. R is hydrocarbyl containing only atoms of hydrogen and carbon, or is substituted hydrocarbyl containing additional atoms in the form of substituents such as halo, lower alkoxy or cyano which are inert under the conditions at which the polyester is formed. R' is hydrogen or lower alkanyl of up to 4 carbon atoms such as formyl or acetyl. These R' groups are equivalent so far as the production of the liquid crystal polyester is concerned but for convenience and clarity the monomer is considered as the dihydroxy compound. Illustrative of such compounds are hydroquinone, chlorohydroquinone, 2,6-dihydroxynaphthalene, 1,4-dihydroxynaphthalene and 4,4'-dihydroxybiphenyl.

When a polyester contains monomer units based on dihydroxy compounds it will also contain units based on an aromatic dicarboxylic acid. The aromatic dicarboxylic acid is provided as the free acid or in an equivalent form such as an ester or an acid halide. Such dicarboxylic acid compounds are represented by the formula

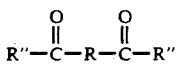

(III)

wherein R has the previously stated meaning and R'' is hydroxy, halogen, preferably middle halogen chloro or bromo, or lower alkoxy of up to 4 carbon atoms. Illustrative dicarboxylic acid compounds include terephthalic acid, dimethyl terephthalate, terephthaloyl chloride, 2,6-naphthalenedicarboxylate.

The hydroxyaromatic acid is in similar fashion provided as the free acid or as an equivalent compound. Such compounds are of the formula

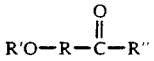

(IV)

wherein R, R' and R'' have the previously stated meanings. Illustrative of hydroxyaromatic acid compounds are p-hydroxybenzoic acid, 6-hydroxynapthalenecarboxylic acid, p-acetoxybenzoic acid, propyl hydroxybenzoate and methyl 6-hydroxynaphthalenecarboxylate. The preferred liquid crystal polymers contain units derived from p-hydroxybenzoic acid, units derived from hydroquinone and 2,6-naphthalenedicarboxylic acid, or mixtures of such units.

The polymers are therefore of variable composition although preferred polymers have up to about 90% by mole of a moiety derived from one hydroxyaromatic acid compound p-hydroxybenzoic acid, i.e., a p-oxybenzoyl moeity, up to 90% by mole of a moiety derived from a second hydroxyaromatic carboxylic acid 6-hydroxynaphthalene carboxylic acid, i.e., a 6-oxy-2-naphthoyl moiety, and up to 50% by mole of each of moieties derived from the aromatic dihydroxy compound and the aromatic dicarboxylic acid compound, with the total of the components being 100%. By way of specific illustration, illustrative thermotropic liquid crystal polymers contain, in one embodiment, from about 10% by mole to about 90% by mole, preferably from about 15% by mole to about 35% by mole of p-oxybenzoyl moiety derived from a p-hydroxybenzoic acid compound with the substantial remainder being 6-oxo-2-naphthoyl moiety derived from a 6-hydroxy-2-naphthalenecarboxylic acid compound. In a second illustrative embodiment, the polymer contains from about 10% by mole to about 70% by mole of 6-oxy-2-naphthoyl moiety and from about 10% by mole to about 45% by mole of a moiety of each of an aromatic dihydroxy compound and an aromatic dicarboxylic acid compound. Other specific embodiments will be apparent from the above discussion in the Dobb et al, article. The production of the liquid crystal polymers and specific illustrations are well known in the art. By way of illustration, see Kleinschuster et al., U.S. Pat. No. 4,066,620; Calundann, U.S. Pat. No. 4,256,624, U.S. Pat. No. 4,184,996 and U.S. Pat. No. 4,161,470 and East et al., U.S. Pat. No. 4,355,133.

The blends of the invention comprise a mixture of a major proportion of the polyketone polymer and a minor proportion of the liquid crystal polymer. The precise proportion of the liquid crystal polymer is not critical and amounts of the liquid crystal polymer from about 0.1% by weight to about 35% by weight based on total blend are suitable, with amounts of liquid crystal polymer from about 1% by weight to about 25% by weight on the same basis being preferred.

The method of producing the blends of the polyketone polymer and the liquid crystal polymer is not material so long as an intimate mixture of the blend components is obtained, i.e., a uniform mixture that will not delaminate upon processing. The blend of polyketone polymer and liquid crystal polymer is a partially miscible blend, with the liquid crystal polymer partially existing as a discrete phase within a polymeric matrix. The blend will not, of course, be homogeneous but the distribution of the liquid crystal polymer throughout the continuous polyketone polymer phase will be uniform. The method of blending the components is that which is conventional for thermoplastic materials. In one modification the components are blended by passage through a corotating twin screw extruder operating at high RPM. In an alternate modification, the components are blended in a mixing device which exhibits high shear and provides high thermal energy.

The blends of the invention may also contain conventional additives such as antioxidants, stabilizers, fire retardant materials, mold release agents and other substances which are added to improve the processability of the component polymers or modify the properties of the blend. Such additives are added by conventional methods prior to, together with or subsequent to the blending of the components.

The blends of the invention are characterized by improved processability and demonstrate improved mechanical and barrier properties. The blends are processed by methods which are conventional for thermoplastics such as extrusion, injection molding and thermoforming into sheets, films and shaped articles useful in packaging, containers for food and drink and for internal and external parts for automative applications. The combination of improved barrier properties, particularly against oxygen and water vapor, and mechanical strength offers particular advantage in the construction by injection molding of thin walled containers for food.

The invention is further illustrated by the following Illustrative Embodiments which should not be construed as limiting the invention.

Illustrative Embodiment I

A linear alternating terpolymer of carbon monoxide, ethylene and propylene was produced in the presence of a catalyst composition formed from palladium acetate, the anion of trifluoroacetic acid and 1,3-bis[di-(2-methoxyphenyl)phosphino]propane. The terpolymer had a melting point of 220° C. and an LVN, measured in m-cresol at 60° C., of 1.7 dl/g.

Illustrative Embodiment II

Blends were prepared of the terpolymer of Illustrative Embodiment I and VECTRA ® A900, an unfilled liquid crystal polymer based on 2,6-naphalene units. This polymer is commercially available from Hoeschst Celanese. The blending was accomplished by passing a mixture of the two polymers through a 30 mm twin screw corotating extruder operating at 270° C. Blends containing 1%, 5% and 20% by weight of the liquid crystal polymer, based on total blend, were produced. Portions of the blends were injection molded into test plaques of 125 mil thickness. The improvement in melt processability obtained through provision of the polymer blends, as measured during the production of these plaques, is shown by the data of Table I.

TABLE I

| Sample, % liquid crystal polymer | RPM at constant torque | Required injection pressure |
|---|---|---|
| 0 (control) | 290 | 475 |
| 1% | 325 | 400 |
| 5% | 346 | 375 |
| 20% | 349 | 300 |

Illustrative Embodiment III

The plaques of Illustrative Embodiment II were then compression molded into films of 10 mil thickness. The films were evaluated for water vapor transmission using a Mocon Permeation W1 operating at 100° C. and 90% relative humidity. The results of the evaluation are shown in Table II.

TABLE II

| Sample, % liquid crystal polymer | Water vapor transmission rate, gm-mil/100 in$^2$-day |
|---|---|
| 0 | 11.5 |
| 1 | 10.8 |
| 5 | 9.8 |
| 20 | 3.9 |

Illustrative Embodiment IV

Test specimens of the terpolymer of Illustrative Embodiment I and the blends of Illustrative Embodiment II were produced by injection molding. The specimens were ⅛-inch thick. These specimens were evaluated for mechanical properties by ASTM methods. The results of the evaluation are shown in Table III.

TABLE III

| Property | Sample, % liquid crystal polymer | | | |
|---|---|---|---|---|
| | 0 | 1 | 5 | 20 |
| Flex modulus (psi) | 280,000 | 291,000 | 315,000 | 452,000 |
| Tensile strength | | | | |
| at yield (psi) | 9400 | 9200 | 9300 | 9800 |
| at break (psi) | 7600 | 7900 | 7000 | 9700 |
| Elongation to break (psi) | 61 | 118 | 44 | 5 |
| Gardner impact (in. lb.) | | | | |
| room temperature | 309 | >320 | 55 | 14 |
| −20° F. | 121 | 102 | 14 | 3 |
| Notched Izod impact (ft.lb./in.) | 4.2 | 3.5 | 3.1 | 1.7 |
| Heat distortion temp. (°C.) at 264 psi | 125 | 140 | 139 | — |

What is claimed is:

1. A polymer blend consisting essentially of a major proposition of a linear alternating polymer of carbon monoxide and at least one ethylenically unsaturated hydrocarbon and from about 0.1% by weight to about 35% by weight, based on total blend, of a thermotropic liquid crystal polymer.

2. The blend of claim 1 wherein the linear alternating polymer is represented by the repeating formula $$+CO+CH_2-CH_2+_x+CO+G+_y$$

wherein G is a moiety of an ethylenically unsaturated hydrocarbon of at least 3 carbon atoms polymerized through the ethylenic unsaturation thereof and the ratio of y:x is no more than about 0.5.

3. The blend of claim 2 wherein the thermotropic liquid crystal is a liquid crystal polyester having units based on at least one hydroxyaromatic carboxylic acid, units based on an aromatic dihydroxy compound and an aromatic dicarboxylic acid compound, or mixtures of these units.

4. The blend of claim 3 wherein the hydroxyaromatic compound is represented by the formula $$R'O-R-\overset{O}{\overset{\|}{C}}-R''$$

wherein R is a divalent aromatic radical of up to 20 carbon atoms and up to 2 aromatic rings wherein the connecting valences of R are parallel, R′ is hydrogen or lower alkanyl, and R″ is hydroxy, halogen or lower alkoxy.

5. The blend of claim 3 wherein the aromatic dihydroxy compound is represented by the formula $$R'-O-R-O-R'$$

and the aromatic dicarboxylic acid compound is represented by the formula $$R''-\overset{O}{\overset{\|}{C}}-R-\overset{O}{\overset{\|}{C}}-R''.$$

6. The blend of claim 2 wherein the liquid crystal polymer includes up to about 90% by mole of units derived from a p-hydroxybenzoic acid compound, up to 90% by mole of units derived from a 6-hydroxy-2-naphthalenecarboxylic acid compound, and up to 50% by mole of units derived from each of aromatic dihydroxy compound and aromatic dicarboxylic acid compound, the total of units being 100%.

7. The blend of claim 6 wherein y is zero.

8. The blend of claim 6 wherein G is a moiety of propylene and the ratio of y:x is from about 0.01 to about 0.1.

9. The blend of claim 8 wherein the liquid crystal polymer comprises from about 10% by mole to about 70% by mole of 6-oxo-2-naphthoyl units and from about 10% by mole to about 45% by mole of units based on aromatic dihydroxy compound and aromatic dicarboxylic acid.

10. The blend of claim 9 wherein the units based on aromatic dihydroxy compound and aromatic dicarboxylic acid compound are based on hydroquinone and terephthalic acid.

11. The polymer blend comprising a linear alternating polymer of carbon monoxide and at least one ethylenically unsaturated hydrocarbon and from about 1 wt % to about 25 wt %, based on total blend, of a thermotropic liquid crystal polymer, wherein the polymer blend exhibits a water vapor transmission rate of less than about 10 gm-mil/100 in$^2$-day.

12. The blend of claim 11 wherein the linear alternating polymer is represented by the repeating formula $$\left[CO\left(CH_2-CH_2\right)\right]_x\left[CO\left(G\right)\right]_y$$

wherein G is a moiety of an ethylenically unsaturated hydrocarbon of at least 3 carbon atoms polymerized through the ethylenic unsaturation thereof and the ratio of y:x is not more than about 0.5.

13. The blend of claim 12 wherein the thermotropic liquid crystal is a liquid crystal polyester having units based on at least one hydroxyaromatic carboxylic acid, units based on an aromatic dihydroxy compound and an aromatic dicarboxylic acid compound, or mixtures of these units.

14. The blend of claim 13 wherein the hydroxyaromatic compound is represented by the formula $$R'O-R-\overset{\overset{\displaystyle O}{\|}}{C}-R''$$

wherein R is a divalent aromatic radical of up to 20 carbon atoms and up to 2 aromatic rings wherein the connecting valences of R are parallel, R′ is hydrogen or lower alkanyl, and R″ is hydroxy, halogen or lower alkoxy.

15. The blend of claim 13 wherein the aromatic dihydroxy compound is represented by the formula $$R'-O-R-O-R'$$

and the aromatic dicarboxylic acid compound is represented by the formula $$R''-\overset{\overset{\displaystyle O}{\|}}{C}-R-\overset{\overset{\displaystyle O}{\|}}{C}-R''.$$

16. The blend of claim 12 wherein the liquid crystal polymer includes up to about 90% by mole of units derived from a p-hydroxybenzoic acid compound, up to 90% by mole of units derived from a 6-hydroxy-2-naphthalenecarboxylic acid compound, and up to 50% by mole of units derived from each of aromatic dihydroxy compound and aromatic dicarboxylic acid compound, the total of units being 100%.

17. The blend of claim 16 wherein y is zero.

18. The blend of claim 16 wherein G is a moiety of propylene and the ratio of y:x is from about 0.01 to about 0.1.

19. A method of improving the barrier properties of a linear alternating polymer of carbon monoxide and at least one ethylenically unsaturated hydrocarbon by including therein an effective amount of a thermotropic liquid crystal polymer.

* * * * *